United States Patent
Hernandez et al.

(10) Patent No.: US 11,225,427 B2
(45) Date of Patent: Jan. 18, 2022

(54) SEQUESTRATION OF MACRONUTRIENTS FROM ANAEROBIC WASTEWATER TREATMENT WITH IRON- AND STEEL-MAKING SLAGS

(71) Applicants: The Regents of the University of Colorado, Denver, CO (US); Phoenix Services LLC, Kennett Square, PA (US)

(72) Inventors: Mark T. Hernandez, Boulder, CO (US); Azize Azra Bilgin, Boulder, CO (US); Dennis G. Grubb, Lansdale, PA (US)

(73) Assignees: The Regents of the University of Colorado, Denver, CO (US); Phoenix Services LLC, Kennett Square, PA (US)

( * ) Notice: Subject to any disclaimer, the term of this patent is extended or adjusted under 35 U.S.C. 154(b) by 0 days.

(21) Appl. No.: 16/493,895

(22) PCT Filed: Mar. 13, 2018

(86) PCT No.: PCT/US2018/022223
§ 371 (c)(1),
(2) Date: Sep. 13, 2019

(87) PCT Pub. No.: WO2018/169986
PCT Pub. Date: Sep. 20, 2018

(65) Prior Publication Data
US 2020/0087184 A1   Mar. 19, 2020

Related U.S. Application Data

(60) Provisional application No. 62/470,682, filed on Mar. 13, 2017.

(51) Int. Cl.
*C02F 3/12* (2006.01)
*C02F 11/04* (2006.01)
(Continued)

(52) U.S. Cl.
CPC ............ *C02F 11/04* (2013.01); *C02F 3/1215* (2013.01); *C22B 1/14* (2013.01); *C22B 3/04* (2013.01);
(Continued)

(58) Field of Classification Search
CPC .. C02F 3/1215; C02F 1/281; C02F 2101/105; C02F 11/04; C02F 1/28; C02F 3/28
(Continued)

(56) References Cited

U.S. PATENT DOCUMENTS

2013/0213883 A1* 8/2013 Josse ...................... C02F 11/04
210/630
2013/0264283 A1 10/2013 O'Flaherty et al.
(Continued)

FOREIGN PATENT DOCUMENTS

WO   2017011642 A1   1/2017

OTHER PUBLICATIONS

Li et al., "Remove and recover phosphorus during anaerobic digestion of excess sludge by adding waste iron scrap", Journal of the Serbian Chemical Society, 78 (2), pp. 303-312. (Year: 2013).*
(Continued)

*Primary Examiner* — Claire A Norris
(74) *Attorney, Agent, or Firm* — Saul Ewing Arnstein & Lehr LLP; Kathryn Doyle; Domingos J. Silva

(57) ABSTRACT

Residuals, such as slag particles, from iron- and/or steel-making, and/or water-leached eluates thereof, are added directly to a conventional or multi-staged anaerobic digester or other sewage sludge or biosolid handling process. The slag particles or other residuals sorb, sequester, immobilize,
(Continued)

or otherwise promote the removal of phosphorus and/or sulfur from wastewater, sludge, or biosolids being treated, such that the associated aqueous phase concentrations of phosphorus and sulfur are significantly reduced.

15 Claims, 5 Drawing Sheets

(51) Int. Cl.
*C22B 1/14* (2006.01)
*C22B 3/04* (2006.01)
*C22B 7/04* (2006.01)
*C02F 101/10* (2006.01)
*C02F 103/16* (2006.01)

(52) U.S. Cl.
CPC .......... *C22B 7/04* (2013.01); *C02F 2101/101* (2013.01); *C02F 2101/105* (2013.01); *C02F 2103/16* (2013.01); *C02F 2303/10* (2013.01)

(58) Field of Classification Search
USPC .................................................. 210/667, 906
See application file for complete search history.

(56) References Cited

U.S. PATENT DOCUMENTS

2014/0072994 A1* 3/2014 Pidaparti ................ C12M 23/36
435/29
2014/0138320 A1 5/2014 Siwek et al.

OTHER PUBLICATIONS

Asaoka, et al., "Removal of Hydrogen Sulfide Using Carbonated Steel Slag", Chem Engr J, vol. 228, 2013, pp. 843-849.
Barca, et al., "Steel Slag Filters to Upgrade Phosphorus Removal in Small Wastewater Treatment Plants: Removal Mechanisms and Performance", Ecological Engineering, vol. 68, 2014, pp. 214-222.
International Search Report and Written Opinion dated May 25, 2018 for PCT International Application No. PCT/US2018/022223.

* cited by examiner

SEQUESTRATION OF MACRONUTRIENTS FROM ANAEROBIC WASTEWATER TREATMENT WITH IRON- AND STEEL-MAKING SLAGS

CROSS-REFERENCE TO RELATED APPLICATIONS

The present application is a 35 U.S.C. § 371 national phase application of, and claims priority to, International Application No. PCT/US2018/022223, filed Mar. 13, 2018, which claims priority under 35 U.S.C. § 119(e) to U.S. Provisional Applications No. 62/470,682, filed Mar. 13, 2017, all of which applications are incorporated herein by reference in their entireties.

FIELD OF THE INVENTION

This disclosure relates to methods for sequestering phosphorus and sulfur from wastewater, and in particular to methods in which iron- and/or steel-making slags are added directly to one or more of an anaerobic digester, a sludge source associated with an anaerobic digester, a sludge feed associated with an anaerobic digester, and a biosolids handling process associated with an anaerobic digester, to sorb, sequester, immobilize, or otherwise promote the removal of phosphorus and sulfur from wastewater, sludge feed, and/or biosolids, so as to significantly reduce the concentrations of phosphorus and sulfur in the immediate aqueous phase, surrounding moisture, and/or associated biogas or other gas, regardless of the absence or presence of other reagents used to directly treat sewage, including but not limited to metal salts.

DESCRIPTION OF THE RELATED ART

Anaerobic digestion is a process for reducing the volume of sewage sludge that is widely practiced in both developed and developing countries; nearly every major metropolitan area in the world uses anaerobic digestion, either alone or in combination with other processes, to treat sewage sludge solids and/or settled or otherwise concentrated solids from wastewaters or livestock confinements. Anaerobic digestion is an advantageously simple process that requires relatively little in the way of resources and produces large volumes of at least two reusable byproducts: (1) stabilized biosolids, which can be applied to land as fertilizer, and (2) natural (bio)gas, which can be burned for heat, used in internal combustion engines, used in commercial generators to produce electricity, and/or sold as a fuel source to third parties in the energy and pipeline industries.

In the developed world, and particularly in the United States, Europe, Australia, Brazil, and Japan, anaerobic digesters are employed to create renewable energy at many large wastewater treatment plants. The "biogas" produced by an anaerobic digester consists primarily of methane, which is frequently used for on-site cogeneration of electricity. Conversion of anaerobic digester biogas has produced at least 500 gigawatt-hours of electrical energy in the United States since 2010. At the same time, advances in the efficiency and reliability of biogas combustion engines have made energy recovery from digesters increasingly cost-effective, resulting in steady growth of the market for cogeneration of electricity from anaerobic digester biogas.

Despite these benefits, anaerobic digestion as currently practiced suffers from several drawbacks. Anaerobic digestion is a relatively fragile microbiological process, the efficiency of which is sensitive to changes in the concentrations of growth factors and trace elements (e.g. iron, calcium, and other metals), pH, alkalinity, phosphorus content, and ammonia content. Alone, anaerobic digestion also transfers potentially valuable phosphorus and sulfur species into byproducts as gases (e.g. hydrogen sulfide), liquids (e.g. phosphates and phosphate complexes), and/or solids (e.g. struvite (magnesium ammonium phosphate)). In particular, struvite can cause significant scaling in post-digestion piping networks, pumps, and treatment processes and thus result in costly operation and maintenance problems. Furthermore, anaerobic digestion as currently practiced produces a biogas that contains significant quantities of carbon dioxide and hydrogen sulfide, in addition to methane. Specifically, hydrogen sulfide is itself toxic, and its oxidation products (sulfurous and sulfuric acids) are corrosive and dangerous; further, they are costly and time-consuming to remove, since unit engineering processes expressly directed to removal of hydrogen sulfide must be dedicated to prevent human exposures and corrosion of associated engineering systems, such as energy recovery systems. Finally, anaerobic digestion, as currently practiced, requires downstream sludge dewatering and additional processing to remove or otherwise manage phosphorus species to meet discharge limits.

Thus, there is a need in the art for an anaerobic digestion wastewater treatment process that is more robust than those currently available, thereby obviating numerous operational and maintenance costs upstream and/or downstream of fermentation units by sequestering phosphorus and sulfur directly within the digester. It is further advantageous for such a process to mitigate the production of hydrogen sulfide and yield improved dewatering and phosphorus removal performance, and to transfer phosphorus and sulfur into a biosolid for its plant nutrient value or other uses.

SUMMARY

These and other needs are addressed by the addition of certain types of residuals from iron- and steel-making processes, particularly certain types and size fractions of steel slag granules and/or fines, that have not been otherwise subjected to intentional chemical manipulation, directly to an anaerobic digestion process and/or an associated biosolids handling process. Specifically, the addition of basic oxygen furnace (BOF) steel slag particles less than 10 mm in diameter to the anaerobic digestion process has a net augmentative and/or probiotic effect on some microbial anaerobic digestion agents, which positively impacts biogas production and the methane content of biogas. Moreover, the concomitant removal of reduced sulfur (hydrogen sulfide) enriches the biogas methane content, and thus biogases produced by the present invention are of a higher quality, and in particular are higher in methane, than biogases produced by processes of the prior art. Because a common municipal digester produces thousands of cubic meters of biogas per day, even a small increase in the methane fraction of the biogas can result in a significant increase of the electricity cogeneration potential.

BOF and/or electric arc furnace (EAF) steel slag is already widely available as agricultural lime; the ability of steel slag to sequester phosphorus in an anaerobic digester enhances its agricultural value. This is particularly valuable in the context of sewage sludge processing, due to the levels of phosphates in anaerobically digesting sludge that are otherwise left in the supernatant. The steel slag can also be added to the residual digester sludge, otherwise known as the "biosolids," which after dewatering can be applied to land as fertilizer. Because phosphorus is a critical nutrient in fertilizer, the addition of the slag fines thus adds beneficial reuse value by increasing the phosphorus content of biosolids-based fertilizers.

The removal of phosphorus species, particularly phosphates, can also have a synergistic benefit in that it reduces the need for other chemicals, e.g. acetic acid or other carbon source, in enhanced biological phosphorus removal (EBPR) processes. Compliance with environmental regulations governing the discharge of phosphates and other phosphorus species is made easier by the methods of the present invention as well.

Given the large volumes of sewage sludge that must be processed (on the order of gigatons per year), many treatment facilities pre- or post-treat the sludge by any number of ancillary processes, including but not limited to pH or alkalinity adjustment, addition of sludge dewatering agents, addition of foaming inhibition agents, addition of struvite control agents, and hydrogen sulfide control. Because of their size, high iron, calcium, and residual lime content, and desirable sorption properties, slag fines may aid in any or all of these ancillary processes using existing chemical delivery equipment, significantly simplifying the overall treatment process and reducing and/or eliminating reliance on other chemical reagents. The addition of the slag granules and/or fines is particularly effective at preventing struvite formation in conventional anaerobic digestion and associated heating systems, as well as downstream sludge treatment and solids handling processes (which can cause costly operational and maintenance problems, reduced capacity, equipment damage, and system downtime) and, if the slag contains iron oxides and/or oxyhydroxides, reducing the quantity of hydrogen sulfide and carbon dioxide in the aqueous-phase digester liquor that partitions into the biogas, thus yielding a higher-quality biogas and mitigating the extent of further treatments to "scrub" the biogas.

Additionally, in current anaerobic digestion processes, the dewatering of effluent biosolids can add significant cost. Polymer conditioning costs for centrifugal dewatering averages about $24 per million gallons of biosolids, with permanganate adding about $1 per million gallons. The polymer itself can cost between $12 and $80 per dry ton solids. Overall operational and maintenance costs can range from $65 to $209 per dry ton. Slag may improve dewatering performance and thus reduce associated operational costs owing to its coarse fraction by acting as a colloidal nucleation agent, a sorbent, and/or a charge density change agent, or otherwise modifying surface tension. In this context, steel slag granules and/or fines may also change the charge density and/or surface tension of the aqueous environment of anaerobically digesting sludge, which in turn may mitigate foaming potential.

The following references provide additional disclosure relevant to the present invention and are incorporated herein by reference in their entireties:

Kyunghoi Kim et al., "Mechanisms of hydrogen sulfide removal with steel making slag," 46(18) *Environmental Science & Technology* 10169 (August 2012) (hereinafter "Kim").

Wei Zheng et al., "Removal and recovery of phosphorus during anaerobic digestion of excess sludge by the addition of waste iron scrap," 78(2) *Journal of the Serbian Chemical Society* 303 (February 2013) (hereinafter "Zheng").

Satoshi Asaoka et al., "Removal of hydrogen sulfide using carbonated steel slag," 228 *Chemical Engineering Journal* 843 (July 2013) (hereinafter "Asaoka").

Chinese Patent Application Publication 103539328, titled "In-situ sulfur-fixing agent for sludge anaerobic digestion and its preparation method and use," published 29 Jan. 2014 to Zhao et al. (hereinafter "Zhao").

Cristian Barca et al., "Steel slag filters to upgrade phosphorus removal in small wastewater treatment plants: removal mechanisms and performance," 68 *Ecological Engineering* 214 (July 2014) (hereinafter "Barca").

PCT Application Publication 2017/011642, titled "Elution systems for treatment of distressed waters," published 19 Jan. 2017 to Grubb (hereinafter "Grubb").

A particular advantage of the present invention over the prior art, including any and all of the previously incorporated references, is the addition of slag fines, which, other than natural weathering, may be chemically unmodified prior to addition to an anaerobic digestion process; such addition simultaneously sequesters phosphorus and sulfur from wastewater, sludge, and/or biosolids into the digestate while also providing a probiotic effect (i.e. the phosphorus and sulfur-rich materials promote the growth of the anaerobic bacteria), improving the effectiveness of the anaerobic digestion process. The sequestered phosphorus and sulfur may then be recovered from the digestate.

The above-described benefits, embodiments, and characterizations are not necessarily complete or exhaustive, particularly as to the patentable subject matter disclosed herein. Other benefits, embodiments, or characterizations of the present disclosure are possible as set forth above, as described in the accompanying figures, and as in the description herein below. However, the Detailed Description of the Invention, the drawing figures, and the claims set forth herein, taken in conjunction with this Summary, exemplify aspects of the invention.

The accompanying drawings, which are incorporated in and constitute a part of the specification, illustrate embodiments of the disclosure and, together with the general description of the disclosure given above and the detailed description of the drawings given below, serve to explain the principles of the disclosure.

DETAILED DESCRIPTION OF THE INVENTION

As used herein, the term "macronutrient" refers to any one or more of nitrogen, phosphorus, and sulfur.

As used herein, the term "micronutrient" refers to any nutrient required in small quantities by plants and/or animals. Micronutrients include, but are not limited to, trace minerals, trace metals, growth factors, and compounds and elements recognized as vitamins or parts of vitamins (e.g. cobalt).

As used herein, the term "slag fines" refers to slag particles typically having a maximum characteristic length passing a standard 0.375 inch (9.5 mm) sieve. Slag particles that are too large to be regarded as "slag fines" may be physically modified to reduce their size and thus become "slag fines" as that term is used herein.

Figure 1:
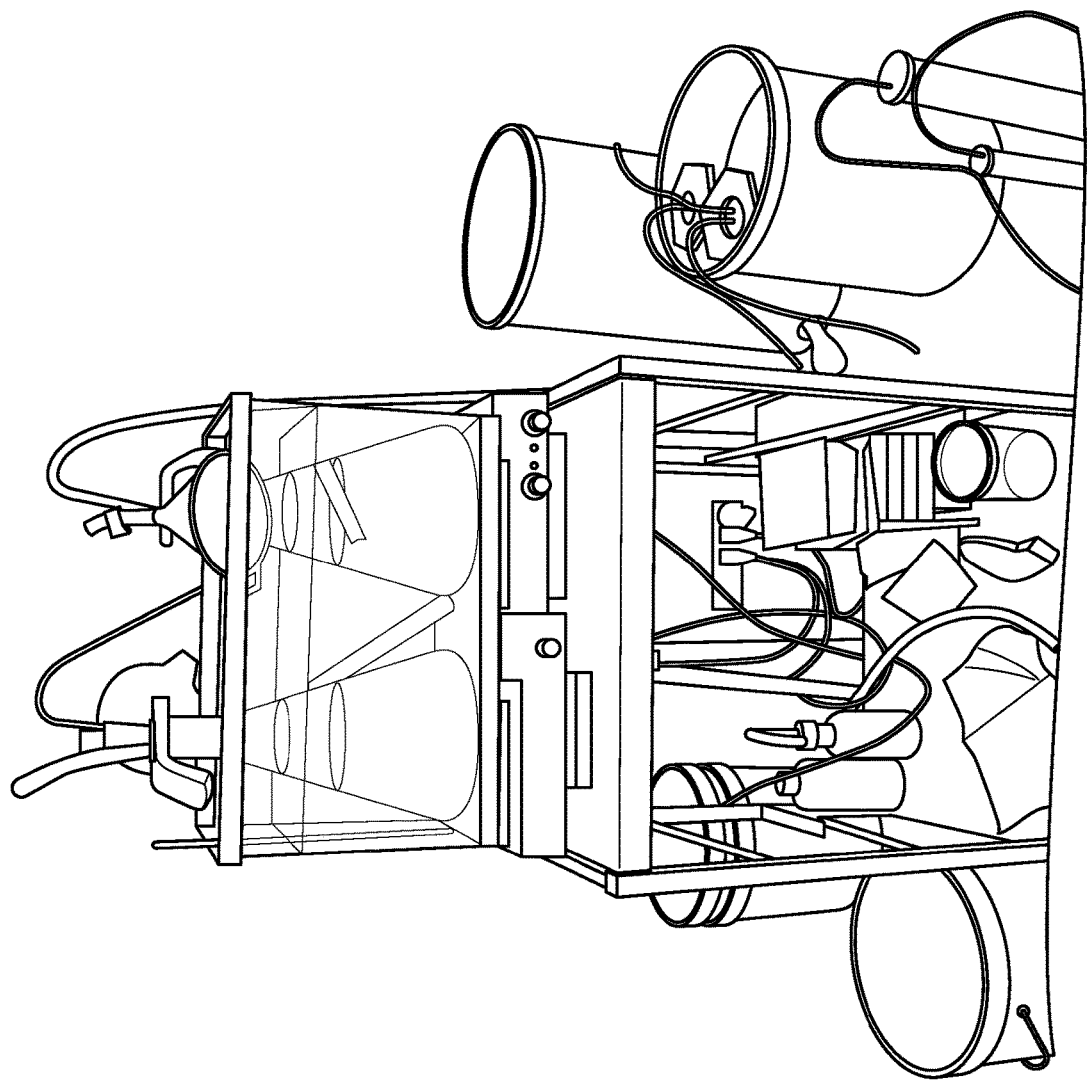
FIG. 1 is a schematic of an anaerobic digester as part of a sanitation system.

FIG. 1 illustrates a general anaerobic digester system for use as part of a sanitation system. Sewage sludge or other wastewater 1 is collected in a digester vessel 2 via an inlet 3. Anaerobic microorganisms are added to, or are otherwise enriched in, the digester vessel 2, and the sludge 1 thus undergoes anaerobic digestion, producing biogas 4 and a digestate 5. The biogas 4 occupies a sealed headspace in the digester vessel 2 above the sludge 1, and may optionally be drawn off or otherwise vented, burned, purified, collected, stored, and/or used for electrical cogeneration. The digestate 5 is transferred to another indoor or outdoor chamber, vessel, bed, or other collection point 6, where it may undergo further post-digestion processing, such as dewatering.

According to embodiments of the present invention, iron- or steel-making slags may be added directly to the digester, the post-digestion collection point(s), or both. Addition of the slag to the digester vessel, the sludge sources that feed the digester, and/or associated downstream sludge handling facilities such as the downstream collection point may be effected continuously or in one or more batches. In particular, certain process parameters, including but not limited to the methane content of the biogas, the phosphorus and/or sulfur content of the sludge and/or digestate, the phosphorus and/or sulfur content of the supernatant, and the pH of the sludge and/or digestate, may be continually or intermittently monitored during digestion, and slag may be metered and added to sludge sources feeding the digester, the digester vessel itself, the piping systems that mix the sludge or control digester temperature, and/or downstream sludge handling facilities such as subsequent chambers, vessels, beds, and other collection points, as appropriate.

According to additional embodiments of the present invention, clean water may be used as an eluant to create and dispense an iron- or steel-making slag eluate into the anaerobic digester, the post-digestion collection point(s), or both; as used herein, the term "clean water" refers to an aqueous medium that is substantially free of species known to react with and/or precipitate the slag. Addition of the slag eluate to the digester vessel, the sludge sources that feed the digester, and/or associated downstream sludge handling facilities such as the downstream collection point may be effected continuously or in one or more batches. In particular embodiments, these methods may comprise a step of flowing clean water into contact with slag for a period of time to form an eluate, and then dispensing the eluate to the anaerobic digester or associated vessel or process. In some embodiments, the clean water eluant may have a pH of between about −1 and about 8, and the slag eluate may have a pH of between about 9 and about 13. In some embodiments, the clean water eluant may comprise at least one of distilled water, deionized water, rain water, tap water, treated water, surface water, and groundwater. In some embodiments, the period of time may be between about 10 seconds and about 10 days. In some embodiments, the eluate may comprise between about 1 mM and about 1000 mM calcium hydroxide.

Examples of slag media that are capable of simultaneous removal of sulfur and phosphorus from anaerobic digesters include, but are not limited to, freshly produced slag, legacy slag (i.e. slag that has been exposed to natural weathering for a period of time, for example in an outdoor slag heap), and water-rinsed or water-leached slag. One advantage of the present invention is that the slag medium need not undergo any intentional chemical manipulation other than that listed above, or indeed at all; the slag medium may comprise any one or more of chemically unmodified fresh slag, weathered (but not water-rinsed or water-leached) slag, water-rinsed or water-leached (but not weathered) slag, and slag that has been both weathered and water-rinsed or water-leached. Those of ordinary skill in the art will, based on this disclosure, understand how to select a particular slag medium for a desired application. By way of non-limiting example, freshly produced slag that has been mechanically processed to a desired particle size distribution will have the greatest quantity of soluble calcium and the greatest pH buffering potential, which may be desirable in many applications, while the use of legacy slag may provide financial and environmental benefits. Water-rinsing or water-leaching of the slag may be particularly advantageous where it is desirable to increase the alkalinity and/or dissolved calcium content of a wastewater treatment process step; the rinse water, leach water, eluate, etc. is rich in alkalinity and dissolved calcium and can be introduced into the wastewater treatment process at various steps, while the resulting rinsed or leached solids, having been stripped of, e.g., lime and/or portlandite, will itself retain significant alkalinity and an enhanced iron content, and will have very high affinity for sulfur and phosphorus when added to the anaerobic digester.

The following Example demonstrates some of the various advantages, benefits, and principles of the present invention.

EXAMPLE

Figure 2:
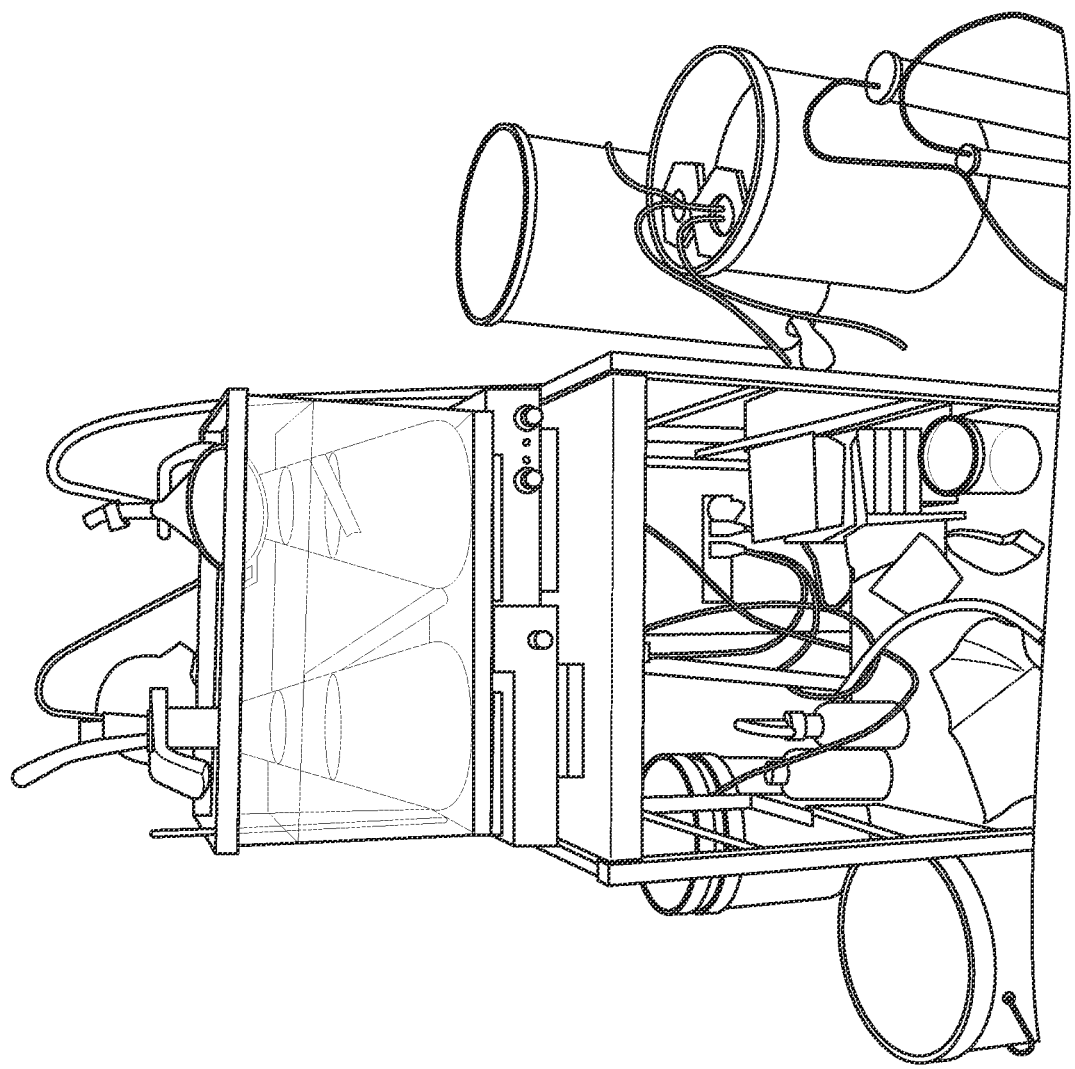
FIG. 2 illustrates a set-up of a bench test system of the present invention.

Two bench-scale anaerobic digesters were established in 4L Erlenmeyer flasks. The digesters were seeded with actively digesting sludge from a wastewater treatment facility. The digesters were stirred intermittently with Teflon-coated magnetic stir bars to ensure adequate mixing. The digesters were operated at a mesophilic temperature of 37° C. with a feed of sludge mixed from primary and secondary sedimentation basins, amended with increasing doses of basic oxygen furnace (BOF) steel slag fines with particle diameters of less than 10 mm. The digesters were operated with a solids retention time of 15 days, typical of municipal operations. The test setup for the Example is illustrated in FIG. 2. Previous co-digestion studies at the same treatment plant determined typical performance parameters for the unamended municipal sludge, which are given in Table 1.

TABLE 1

Typical digester operating parameters

| Parameter | Units | Range | Mean |
|---|---|---|---|
| Loading rate | mg COD/L · d | 6500-7500 | 7000 |
| pH | | 6.8-7.3 | 7.0 |
| Alkalinity | mg CaCO$_3$/L | 1500-2800 | 2000 |
| Methane | % | 60-79 | 65 |
| Carbon dioxide | % | 27-37 | 31 |
| Temperature | ° C. | 35-39 | 36 |
| Volatile fatty acids (C$_2$-C$_5$) | mg/L | 180-225 | 200 |
| Volatile solids | g/L | 2.5-3.7 | 3 |

To assess the influence of slag on digester performance and phosphorus and sulfur removal, the widely accepted anaerobic assay methods reported by Donlon et al. (1995) were modified according to the following procedures and carried out in 125 mL serum vials with gray butyl rubber stoppers and 20 mm aluminum crimp seals. 75 mL of digesting sludge was pipetted into serum vials that served as easily replicated digester microcosms. Slag was added to each microcosm to achieve a final concentration between 0 and 10,000 mg/L. The slag was freshly produced BOF slag, crushed and sieved to pass a conventional sieve size of 0.375 inches. The typical mineralogy of the BOF steel slag, determined by quantitative x-ray powder diffraction using the Rietveld method, is presented in Table 2. The normalized elemental composition of the BOF steel slag is presented in Table 3.

TABLE 2

Typical BOF slag mineralogy

| Chemical name | % weight |
| --- | --- |
| Larnite | 20.6 ± 5 |
| Srebrodolskite | 10.4 ± 3 |
| Iron magnesium oxide | 6.7 ± 3 |
| Brownmillerite | 5.8 ± 2 |
| Wuestite | 5.4 ± 2 |
| Lime | 4.1 ± 2 |
| Portlandite | 6.5 ± 2 |
| Periclase | 3.1 ± 1 |
| Magnetite | 3.0 ± 1 |
| Mayenite | 2.7 ± 1 |
| Quartz | approx. 0.5 |
| Metallic iron | approx. 0.3 |
| Amorphous material | 31.1 ± 5 |

TABLE 3

BOF slag elemental composition

| Element | % weight |
| --- | --- |
| Calcium | 43.4 |
| Iron | 33.1 |
| Silicon | 8.8 |
| Magnesium | 8.1 |
| Manganese | 3.0 |
| Aluminum | 1.6 |
| Carbon | 0.7 |
| Phosphorus | 0.4 |
| Hydrogen | 0.3 |
| Titanium | 0.2 |
| Chromium | 0.2 |
| Sulfur | 0.1 |
| Vanadium | 0.1 |

Controls for the experiment were microcosms including only slag or only digesting sludge. The microcosm headspace was flushed with 20% $CO_2$ balanced with $H_2$ prior to incubation. Each sample was prepared in triplicate and allowed to digest for 48 hours on a shaker table at 37±2° C. After an initial 48-hour incubation, the serum vials were fed again, some with slag fines, after which methane and macronutrient monitoring began. For accurate monitoring of methane production, the headspace of the vial was flushed daily with 20% $CO_2$ balanced with $H_2$. Macronutrients were analyzed following the second feeding at 2, 4, 8, 24, and 48 hours, and then daily, to observe the response to the added BOF steel slag fines. Total solid, volatile solid, COD, macronutrient, and volatile fatty acid analyses were performed at the beginning and end of the incubation period.

Figure 3A:
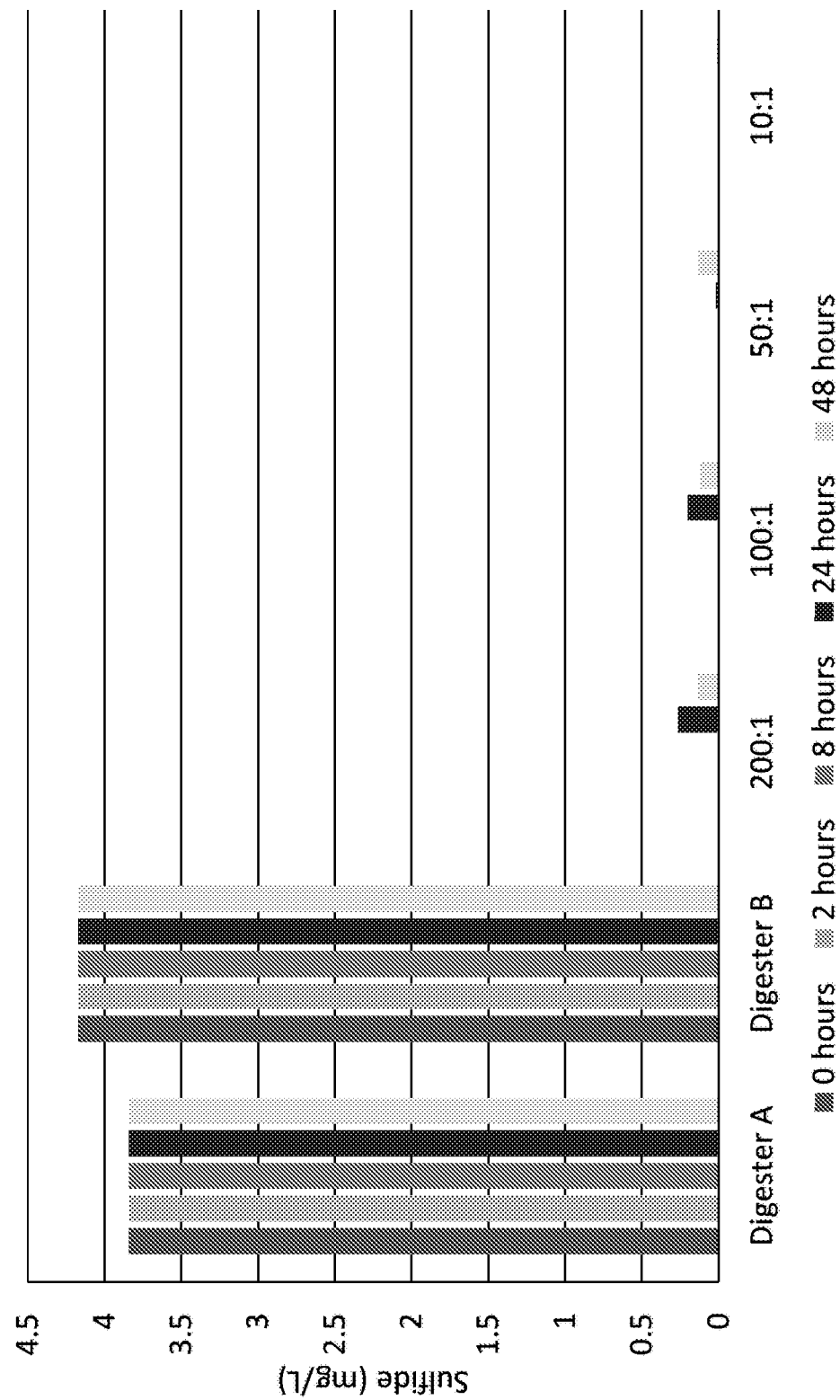
FIGS. 3A, 3B, and 3C illustrate aqueous-phase concentration of soluble sulfide, aqueous-phase concentration of soluble phosphates, and pH, respectively, of microcosms of the bench test.
Figure 3B:
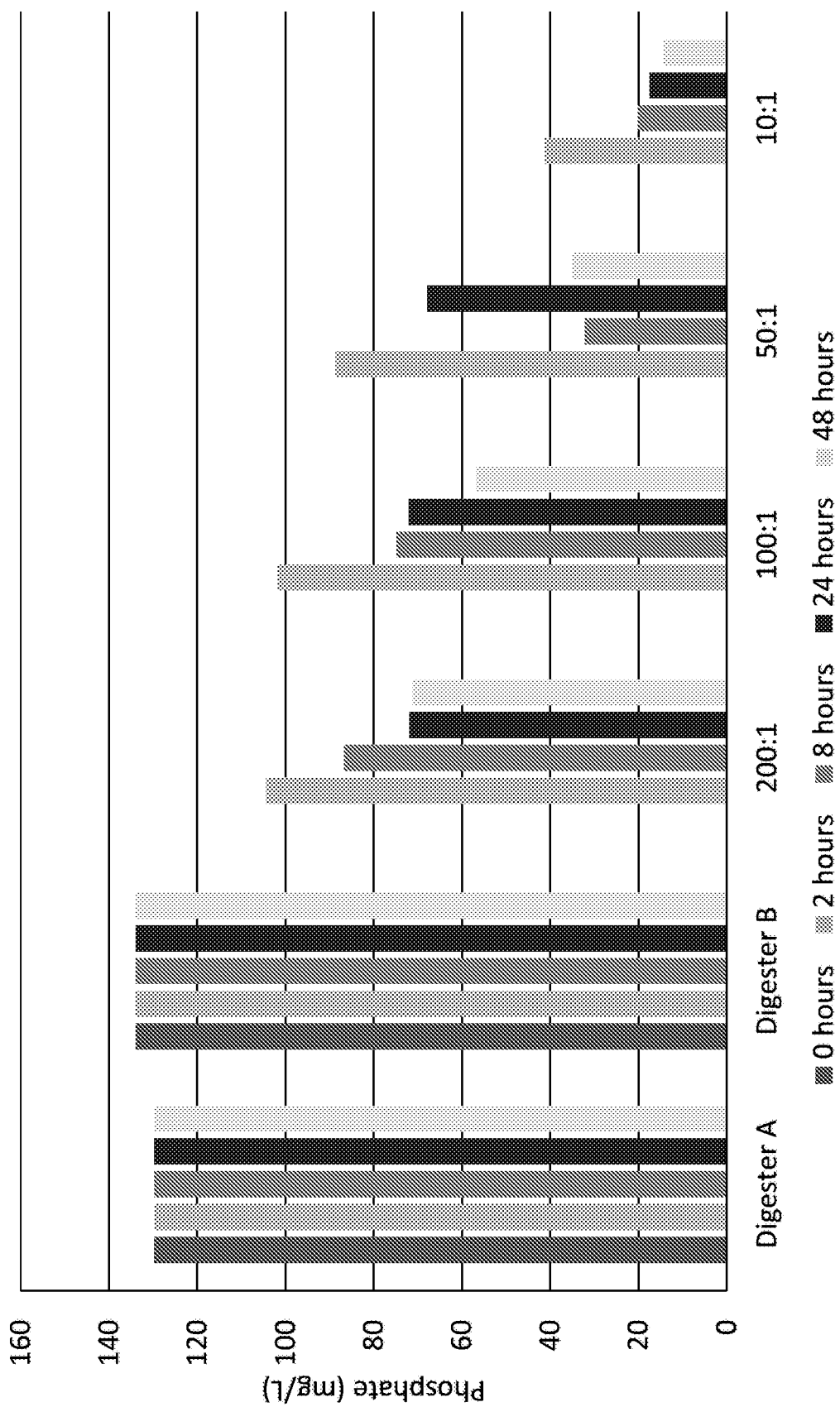
Figure 3C:
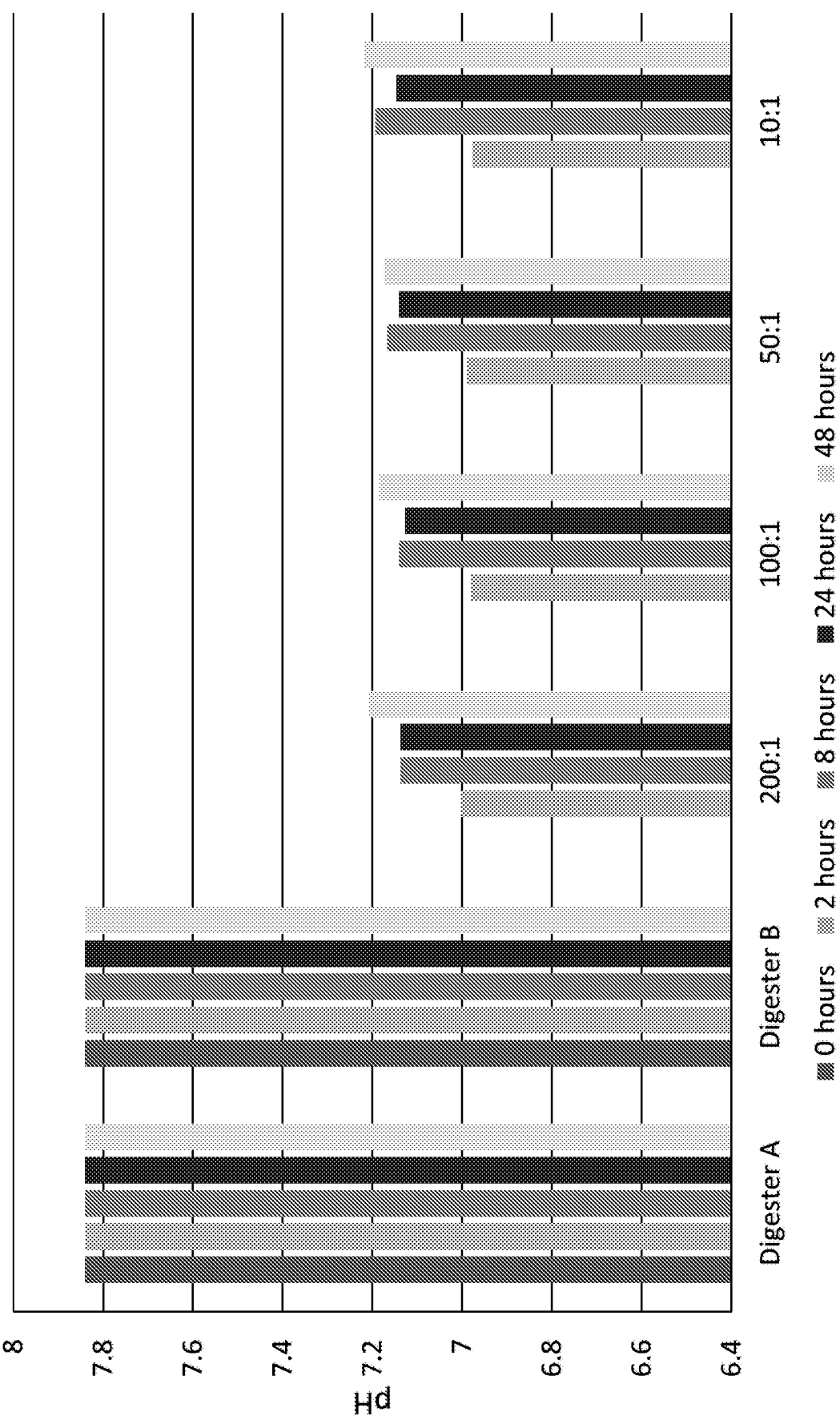

FIGS. 3A, 3B, and 3C illustrate aqueous-phase concentration of soluble sulfide, aqueous-phase concentration of soluble phosphates, and pH, respectively, of four independent test microcosms (average of the three independent samples for each microcosm) as compared to two digester controls (A, B), which served as the independent baseline for the microcosms. The four test microcosms had sludge-to-slag ratios of 200:1, 100:1, 50:1, and 10:1, respectively. FIGS. 3A, 3B, and 3C clearly show that addition of slag to the test microcosms effectively reduced the concentration of hydrogen sulfide at all slag dosing rates, in some cases below detection limits; sequestered a substantial proportion of phosphates into the digestate, with increasing quantities of slag sequestering increasing amounts of phosphates; and affected the pH at all slag dosing rates. As illustrated in FIG. 3A, the concentration of soluble sulfides in the aqueous phase may be reduced by at least about 90%. As illustrated in FIG. 3B, after 48 hours, a 200:1 ratio may sequester about 50% of soluble phosphates, a 100:1 ratio may sequester about 55% of soluble phosphates, a 50:1 ratio may sequester about 75% of soluble phosphates, and a 10:1 ratio may sequester about 90% of soluble phosphates. As illustrated in FIG. 3C, addition of slag may cause the pH to drop from about 7.8 to about 7.0 within the first two hours, and then increase slightly to about 7.2 over the next approximately 22-46 hours, at all slag dosing rates between 200:1 and 10:1.

Residuals suitable for use in embodiments of the present invention may have any appropriate chemical composition. By way of non-limiting example, suitable residuals may be slags having approximately 20-25 wt % iron and/or 20-25 wt % calcium. Steel slag fines typically contain a small percentage of low-grade metallic scrap fines, which may provide an ancillary benefit for phosphorus and sulfur removal and thus may, but need not, be removed.

Suitable slags may be produced or derived from any appropriate process. By way of non-limiting example, fines of air cooled blast furnace (ACBF) slag, basic oxygen furnace (BOF) slag, electric arc furnace (EAF) slag, and converter and ladle (C&L) slag all may be suitable for use in the present invention.

Slag, slag eluates, or other residuals may be added directly to the anaerobic digestion process at any point in the anaerobic process. By way of non-limiting example, a residual may be added to any one or more of a primary or secondary sludge source, piping that feeds, circulates, warms, or otherwise mixes the contents of an anaerobic digester vessel, and an expansion chamber or other post-processing unit. Earlier additions of a fine slag residual and/or slag eluate may be preferable to aid in coagulation or flocculation of primary or secondary sludge in settling basins or clarifiers.

While various embodiments of the present disclosure have been described in detail, it is apparent that modifications and alterations of these embodiments will occur to those skilled in the art. It is to be expressly understood that such modifications and alterations are within the scope of the present disclosure, as set forth in the following claims.

The foregoing discussion of the disclosure has been presented for purposes of illustration and description. The foregoing is not intended to limit the disclosure to the form or forms, or embodiment or embodiments, disclosed herein. In the foregoing Detailed Description, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are incorporated into this disclosure, with each claim standing on its own as a separate preferred embodiment of the disclosure.

Moreover, though the present disclosure has included description of one or more embodiments and certain variations and modifications, other variations and modifications are within the scope of the disclosure, as may be within the skill and knowledge of those skilled in the art after under-standing the present disclosure. It is intended to obtain rights which include alternative embodiments to the extent permitted, including alternate, interchangeable, or equivalent structures, functions, ranges, or steps to those claimed, whether or not such alternate, interchangeable, or equivalent structures, functions, ranges, or steps are disclosed herein, and without intending to dedicate to the public any patentable subject matter.

The invention claimed is:

1. A method for sequestering at least one macronutrient from wastewater or wastewater sludge, comprising:
    (a) receiving wastewater or wastewater sludge in an anaerobic digestion vessel;
    (b) facilitating anaerobic digestion of the wastewater or wastewater sludge at a mesophilic temperature to produce a biogas and a digestate;
    (c) adding a residual to at least one of the anaerobic digestion vessel and a source of sludge that feeds the anaerobic digestion vessel, wherein the residual comprises at least one of steel-making slag fines and an aqueous eluate of steel-making slag fines;
    (d) separating the biogas and the digestate; and
    (e) recovering the at least one macronutrient from the digestate.

2. The method of claim 1, wherein the macronutrient comprises at least one element selected from the group consisting of phosphorus and sulfur.

3. The method of claim 1, wherein the wastewater comprises biological sludge from a municipal, industrial, or agricultural wastewater treatment plant.

4. The method of claim 1, further comprising producing electricity by combustion of the biogas.

5. The method of claim 1, wherein the residual comprises steel-making slag fines.

6. The method of claim 1, wherein the residual comprises at least one iron-containing mineral.

7. The method of claim 6, wherein the at least one iron-containing mineral comprises at least one mineral selected from the group consisting of goethite, ferrihydrite, and hydrohematite, srebrodolskite, iron magnesium oxide, brownmillerite, wuestite, magnetite, and metallic iron and oxides thereof.

8. The method of claim 1, wherein the residual is added to a source of sludge that feeds the anaerobic digestion vessel, wherein the source of sludge comprises piping used to feed, warm, or otherwise mix contents of the anaerobic digestion vessel.

9. The method of claim 1, conducted in the absence of any one or more of pH or alkalinity adjustment, addition of sludge dewatering agents, addition of foaming inhibition agents, addition of struvite control agents, and hydrogen sulfide control agents.

10. The method of claim 1, further comprising recovering one or more of a macronutrient-enriched biosolid and a macronutrient-enriched colloidal slag.

11. The method of claim 1, wherein the residual comprises an aqueous eluate formed by contacting the steel-making slag fines with clean water.

12. The method of claim 1, wherein the residual comprises steel-making slag fines, wherein the steel-making slag fines have not been subjected to any intentional chemical manipulation other than water-rinsing or water-leaching.

13. The method of claim 12, wherein the steel-making slag fines have undergone natural weathering.

14. The method of claim 12, wherein the steel-making slag fines have not been subjected to any intentional chemical manipulation.

15. A wastewater treatment process, comprising:
    (a) receiving wastewater or wastewater sludge in an anaerobic digestion vessel;
    (b) facilitating anaerobic digestion of the wastewater or wastewater sludge at a mesophilic temperature to produce a biogas and a digestate;
    (c) rinsing or leaching steel-making slag fines with clean water to form rinsed or leached slag fines and an aqueous slag eluate;
    (d) adding the rinsed or leached slag fines to at least one of the anaerobic digestion vessel and a source of sludge that feeds the anaerobic digestion vessel;
    (e) adding the aqueous slag eluate to a process unit of the wastewater treatment process;
    separating the biogas and the digestate; and
    (g) recovering a macronutrient from the digestate.

* * * * *